United States Patent
Wiese

(10) Patent No.: US 7,847,004 B2
(45) Date of Patent: Dec. 7, 2010

(54) METHOD FOR PRODUCING AQUEOUS COMPOSITE PARTICLE DISPERSIONS

(75) Inventor: Harm Wiese, Heidelberg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 726 days.

(21) Appl. No.: 11/813,456

(22) PCT Filed: Dec. 31, 2005

(86) PCT No.: PCT/EP2005/014160

§ 371 (c)(1),
(2), (4) Date: Jul. 6, 2007

(87) PCT Pub. No.: WO2006/072464

PCT Pub. Date: Jul. 13, 2006

(65) Prior Publication Data

US 2008/0051500 A1    Feb. 28, 2008

(30) Foreign Application Priority Data

Jan. 6, 2005   (DE) ............... 10 2005 000 918

(51) Int. Cl.
*B01F 17/00* (2006.01)
(52) U.S. Cl. ...................................... 524/431
(58) Field of Classification Search .......... 524/431
See application file for complete search history.

(56) References Cited

U.S. PATENT DOCUMENTS

| 6,756,437 B1 | 6/2004 | Xue et al. |
| 7,094,830 B2 | 8/2006 | Xue et al. |

FOREIGN PATENT DOCUMENTS

| JP | 8 325314 | 12/1996 |
| JP | 2003 238630 | 8/2003 |
| WO | 01 18081 | 3/2001 |
| WO | 03 000760 | 1/2003 |

OTHER PUBLICATIONS

Zeng, Z. et al., "Preparation of Epxy-Functionalized Polystyrene/Silica Core-Shell Composite Nanoparticles", Journal of Polymer Science: Part A: Polymer Chemistry, vol. 42, pp. 2253-2262, 2004.

*Primary Examiner*—Ling-Siu Choi
*Assistant Examiner*—Sonya Wright
(74) *Attorney, Agent, or Firm*—Oblon, Spivak, McClelland, Maier & Neustadt, L.L.P.

(57) ABSTRACT

A process for preparing an aqueous dispersion of particles composed of addition polymer and finely divided inorganic solid (composite particles), in which process ethylenically unsaturated monomers are dispersely distributed in aqueous medium and polymerized by the method of free-radical aqueous emulsion polymerization by means of at least one free-radical polymerization initiator in the presence of at least one dispersely distributed, finely divided inorganic solid and at least one dispersant, which comprises using a monomer mixture comprising >0 and ≦10% by weight of at least one ethylenically unsaturated monomer containing an epoxide group.

18 Claims, No Drawings

METHOD FOR PRODUCING AQUEOUS COMPOSITE PARTICLE DISPERSIONS

The present invention relates to a process for preparing an aqueous dispersion of particles composed of addition polymer and finely divided inorganic solid (composite particles), in which process ethylenically unsaturated monomers are dispersely distributed in aqueous medium and polymerized by the method of free-radical aqueous emulsion polymerization by means of at least one free-radical polymerization initiator in the presence of at least one dispersely distributed, finely divided inorganic solid and at least one dispersant, which comprises using, as ethylenically unsaturated monomers, a monomer mixture composed of ethylenically unsaturated monomers A and >0 and ≦10% by weight of at least one ethylenically unsaturated monomer B containing an epoxide group (epoxide monomer).

The present invention likewise relates to the aqueous composite-particle dispersions obtainable by the process of the invention and to their use as binders, for producing a protective coat, as an adhesive, for modifying cement formulations and mortar formulations, or in medical diagnostics.

The prior art relevant for the present invention is as follows.

Zeng et al. disclose in Journal of Polymer Science: Part A: Polymer Chemistry, Vol. 42, pages 2253 to 2262 the preparation of aqueous composite-particle dispersions whose composite particles have a core/shell structure. The central point of the aforementioned publication is the emulsion polymerization of styrene in the presence of specially surface-treated silicon dioxide particles. In a subsequent second stage the polystyrene/silicon dioxide composite particles obtained are grafted with glycidyl methacrylate. After the end of the emulsion polymerization the core/shell polymer is precipitated by adding aqueous aluminum(III) chloride solution. The preparation of polymer films is not disclosed.

WO 0118081 discloses a special process for preparing aqueous composite-particle dispersions. The examples include the comparison of a composite film prepared from an aqueous composite-particle dispersion with addition-polymer films prepared from an aqueous polymer dispersion with an identical polymer composition as in the composite particles or an identical aqueous polymer dispersion to which identical amounts of finely divided inorganic solid have been admixed as for the preparation of the aqueous composite-particle dispersion. In that comparison the composite film obtainable from the aqueous composite-particle dispersion proved harder than that of the comparative dispersions. In addition the water absorption was significantly lower. In that case, however, the addition polymer on which the composite particles were based did not contain any epoxide groups.

It was an object of the present invention to provide aqueous composite-particle dispersions whose addition-polymer films comprising the finely divided inorganic solids (composite films) have an increased breaking stress.

Accordingly the process defined at the outset has been found.

Composite particles made from addition polymer and finely divided inorganic solid, particularly in the form of their aqueous dispersions, are a matter of general knowledge. They are fluid systems comprising as their disperse phase in disperse distribution, in the aqueous dispersion medium, addition-polymer coils, consisting of a plurality of interwoven addition-polymer chains, referred to as the polymer matrix and particles of finely divided inorganic solid. The average diameter of the composite particles is generally in the range ≧10 nm and ≦1000 nm, often in the range ≧50 nm and ≦400 nm, and frequently in the range ≧100 nm and ≦300 nm.

Composite particles and processes for preparing them in the form of aqueous composite-particle dispersions and also their use are known to the skilled worker and are disclosed for example in the specifications U.S. Pat. No. 3,544,500, U.S. Pat. No. 4,421,660, U.S. Pat. No. 4,608,401, U.S. Pat. No. 4,981,882, EP-A 104 498, EP-A 505 230, EP-A 572 128, GB-A 2 227 739, WO 0118081, WO 0129106, WO 03000760 and also in Long et al., Tianjin Daxue Xuebao 1991, 4, pages 10 to 15, Bourgeat-Lami et al., Die Angewandte Makromolekulare Chemie 1996, 242, pages 105 to 122, Paulke et al., Synthesis Studies of Paramagnetic Polystyrene Latex Particles in Scientific and Clinical Applications of Magnetic Carriers, pages 69 to 76, Plenum Press, New York, 1997, and Armes et al., Advanced Materials 1999, 11, No. 5, pages 408 to 410.

In accordance with the invention it is possible to use all aqueous composite-particle dispersions, including for example those obtainable in accordance with the aforementioned prior art, that have been prepared using a monomer mixture comprising >0 and ≦10%, preferably from 0.1 to 5%, and with particular preference from 0.5 to 3% by weight of epoxide monomers.

One procedure which can be employed with advantage for the process of the invention is disclosed in WO 03000760—hereby expressly incorporated by reference into the context of this specification. The distinguishing feature of that process is that the monomer mixture is dispersely distributed in aqueous medium and is polymerized by the method of free-radical aqueous emulsion polymerization by means of at least one free-radical polymerization initiator in the presence of at least one dispersely distributed, finly divided inorganic solid and at least one dispersant, wherein a) a stable aqueous dispersion of said at least one inorganic solid is used, said dispersion having the characteristic features that at an initial solids concentration of ≧1% by weight, based on the aqueous dispersion of said at least one inorganic solid, it still comprises in dispersed form one hour after its preparation more than 90% by weight of the originally dispersed solid and its dispersed solid particles have a weight-average diameter ≦100 nm, b) the dispersed particles of said at least one inorganic solid exhibit a nonzero electrophoretic mobility in an aqueous standard potassium chloride solution at a pH which corresponds to the pH of the aqueous dispersion medium before the beginning of the dispersant addition, c) at least one anionic, cationic and nonionic dispersant is added to the aqueous solid-particle dispersion before the beginning of the addition of the monomer mixture, d) then from 0.01 to 30% by weight of the total amount of the monomer mixture is added to the aqueous solid-particle dispersion and polymerized to a conversion of at least 90% and e) thereafter the remainder of the monomer mixture is added continuously under polymerization conditions at the rate at which it is consumed.

Finely divided inorganic solids suitable for this process are all those which form stable aqueous dispersions which at an initial solids concentration of ≧1% by weight, based on the aqueous dispersion of said at least one inorganic solid, still comprise in dispersed form one hour after their preparation without stirring or shaking more than 90% by weight of the originally dispersed solid and whose dispersed solid particles have a diameter ≦100 nm and which, furthermore, exhibit a nonzero electrophoretic mobility at a pH which corresponds to the pH of the aqueous reaction medium before the beginning of dispersant addition.

The quantitative determination of the initial solids concentration and the solids concentration after one hour, and the determination of the particle diameters, take place by the method of analytical ultracentrifugation (cf. S. E. Harding et al., Analytical Ultracentrifugation in Biochemistry and Polymer Science, Royal Society of Chemistry, Cambridge, Great Britain 1992, Chapter 10, Analysis of Polymer Dispersions with an Eight-Cell-AUC-Multiplexer: High Resolution Particle Size Distribution and Density Gradient Techniques, W. Mächtle, pages 147 to 175). The particle diameters stated are those known as $d_{50}$ values.

The method of determining the electrophoretic mobility is known to the skilled worker (cf., e.g., R. J. Hunter, Introduction to Modern Colloid Science, Section 8.4, pages 241 to 248, Oxford University Press, Oxford, 1993, and K. Oka and K. Furusawa in Electrical Phenomena at Interfaces, Surfactant Science Series, Vol. 76, Chapter 8, pages 151 to 232, Marcel Dekker, New York, 1998). The electrophoretic mobility of the so id particles dispersed in the aqueous reaction medium is measured using a commercially customary electrophoresis instrument, an example being the Zetasizer 3000 from Malvern Instruments Ltd., at 20° C. and 1 bar (absolute). For this purpose the aqueous dispersion of solid particles is diluted with a pH-neutral 10 millimolar (mM) aqueous potassium chloride solution (standard potassium chloride solution) until the concentration of solid particles is from about 50 to 100 mg/l. The adjustment of the measured sample to the pH possessed by the aqueous reaction medium before the beginning of dispersant addition is carried out using the customary inorganic acids, such as dilute hydrochloric acid or nitric acid, for example, or bases, such as dilute sodium hydroxide solution or potassium hydroxide solution for example. The migration of the dispersed solid particles in the electrical field is detected by means of what is known as electrophoretic light scattering (cf., e.g., B. R. Ware and W. H. Flygare, Chem. Phys. Lett. 12 (1971) pages 81 to 85). In this method the sign of the electrophoretic mobility is defined by the migrational direction of the dispersed solid particles; in other words, if the dispersed solid particles migrate to the cathode, their electrophoretic mobility is positive, while if they migrate to the anode it is negative.

A suitable parameter for influencing or adjusting the electrophoretic mobility of dispersed solid particles to a certain extent is the pH of the aqueous reaction medium. Protonation and, respectively, deprotonation of the dispersed solid articles alter the electrophoretic mobility positively in the acidic pH range (pH<7) and negatively in the alkaline range (pH>7). A pH range suitable for the process disclosed in WO 03000760 is that within which a free-radically initiated aqueous emulsion polymerization can be carried out. This pH range is generally from 1 to 12, frequently from 1.5 to 11, and often from 2 to 10.

The pH of the aqueous reaction medium may be adjusted using commercially customary acids, such as dilute hydrochloric, nitric or sulfuric acid, or bases, such as dilute sodium hydroxide or potassium hydroxide solution, for example. It is often advantageous to add some or all of the quantity of acid or base used for pH adjustment to the aqueous reaction medium before said at least one finely divided inorganic solid is added.

It is of advantage for the process disclosed in WO 03000760 if from 1 to 1000 parts by weight of said finely divided inorganic solid are used per 100 parts by weight of monomer mixture, and if, under the abovementioned pH conditions, when the dispersed solid particles have an electrophoretic mobility having a negative sign, from 0.01 to 10 parts by weight, preferably from 0.05 to 5 parts by weight, and with particular preference from 0.1 to 3 pads by weight, of at least one cationic dispersant, from 0.01 to 100 pads by weight, preferably from 0.05 to 50 parts by weight, and with particular preference from 0.1 to 20 parts by weight, of at least one nonionic dispersant, and at least one anionic dispersant are used, the amount thereof being such that the equivalent ratio of anionic to cationic dispersant is more than 1, or when the dispersed solid particles have an electrophoretic mobility having a positive sign, from 0.01 to 10 parts by weight, preferably from 0.05 to 5 parts by weight, and with particular preference from 0.1 to 3 parts by weight, of at least one anionic dispersant, from 0.01 to 100 parts by weight, preferably from 0.05 to 50 parts by weight, and with particular preference from 0.1 to 20 parts by weight, of at least one nonionic dispersant, and at least one cationic dispersant are used, the amount thereof being such that the equivalent ratio of cationic to anionic dispersant is more than 1.

By equivalent ratio of anionic to cationic dispersant is meant the ratio of the number of moles of anionic dispersant used multiplied by the number of anionic groups comprised per mole of anionic dispersant, divided by the number of moles of cationic dispersant used multiplied by the number of cationic groups comprised per mole of cationic dispersant. The same applies, mutatis mutandis, to the equivalent ratio of cationic to anionic dispersant.

It is possible to include the entirety of the at least one anionic, cationic, and nonionic dispersant used in accordance with WO 03000760 in the initial charge of the aqueous solids dispersion. It is, however, also possible to include only a portion of said dispersants in the initial charge of the aqueous solids dispersion and to add the remainders continuously or discontinuously during the free-radical emulsion polymerization. It is essential to the process, however, that, before and during the free-radically initiated emulsion polymerization, the aforementioned equivalent ratio of anionic and cationic dispersant as a function of the electrophoretic sign of the finely divided solid be maintained. If, therefore, inorganic solid particles are used which under the aforementioned pH conditions have an electrophoretic mobility having a negative sign, then the equivalent ratio of anionic to cationic dispersant during the entire emulsion polymerization must be greater than 1. Correspondingly, in the case of inorganic solid particles with an electrophoretic mobility having a positive sign, the equivalent ratio of cationic to anionic dispersant during the entire emulsion polymerization must be greater than 1. It is advantageous if the equivalent ratios are $\geq 2$, $\geq 3$, $\geq 4 \geq 5$, $\geq 6$, $\geq 7$ or $\geq 10$, particularly advantageous equivalent ratios being those in the range between 2 and 5.

For the process disclosed in WO 03000760, and also generally for the preparation of aqueous composite-particle dispersions, finely divided inorganic solids which can be used include metals, metal compounds, such as metal oxides and metal salts, and also semimetal compounds and nonmetal compounds. Finely divided metal powders which can be used are noble metal colloids, such as palladium, silver, ruthenium, platinum, gold and rhodium, for example, and their alloys. Examples that may be mentioned of finely divided metal oxides include titanium dioxide (commercially available, for example, as Hombitec® grades from Sachtleben Chemie CmbH), zirconium(IV) oxide, tin(II) oxide, tin(IV) oxide (commercially available, for example, as Nyacol® SN grades from Akzo-Nobel), aluminum oxide (commercially available, for example, as Nyacol® AL grades from Akzo-Nobel), barium oxide, magnesium oxide, various iron oxides, such as iron(III) oxide (wustite), iron(III) oxide (hematite) and iron (II/III) oxide (magnetite), chromium(III) oxide, antimony (III) oxide, bismuth(III) oxide, zinc oxide (commercially available, for example, as Sachtotec® grades from Sachtleben Chemie GmbH), nickel(II) oxide, nickel(III) oxide, cobalt(II) oxide, cobalt(III) oxide, copper(II) oxide, yttrium (III) oxide (commercially available, for example, as Nyacol® YTTRIA grades from Akzo-Nobel), cerium(IV) oxide (commercially available, for example, as Nyacol® CEO2 grades from Akzo-Nobel), amorphous and/or in their different crystal modifications, and also their hydroxy oxides, such as, for example, hydroxytitanium(IV) oxide, hydroxyzirconium (IV) oxide, hydroxyaluminum oxide (commercially available, for example, as Disperal® grades from Condea-Chemie GmbH) and hydroxyiron(III) oxide, amorphous and/or in their different crystal modifications. The following metal salts, amorphous and/or in their different crystal structures, can be used in principle in the process of the invention: sulfides, such as iron(II) sulfide, iron(III) sulfide, iron(II) disulfide (pyrite), tin(II) sulfide, tin(IV) sulfide, mercury(II) sulfide, cadmium(II) sulfide, zinc sulfide, copper(II) sulfide, silver sulfide, nickel(II) sulfide, cobalt(II) sulfide, cobalt(III) sulfide, manganese(II) sulfide, chromium(III) sulfide, titanium(II) sulfide, titanium(II) sulfide, titanium(III) sulfide, zirconium(IV) sulfide, antimony(III) sulfide, and bismuth (III) sulfide, hydroxides, such as tin(II) hydroxide, aluminum hydroxide, magnesium hydroxide, calcium hydroxide, barium hydroxide, zinc hydroxide, iron(II) hydroxide, and iron(III) hydroxide, sulfates, such as calcium sulfate, strontium sulfate, barium sulfate, and lead(IV) sulfate, carbonates, such as lithium carbonate, magnesium carbonate, calcium carbonate, zinc carbonate, zirconium(IV) carbonate, iron(II) carbonate, and iron(III) carbonate, orthophosphates, such as lithium orthophosphate, calcium orthophosphate, zinc orthophosphate, magnesium orthophosphate, aluminum orthophosphate, tin(III) orthophosphate, iron(II) orthophosphate, and iron(III) orthophosphate, metaphosphates, such as lithium metaphosphate, calcium metaphosphate, and aluminum meta phosphate, pyrophosphates, such as magnesium pyrophosphate, calcium pyrophosphate, zinc pyrophosphate, iron(III) pyrophosphate, and tin(II) pyrophosphate, ammonium phosphates, such as magnesium ammonium phosphate, zinc ammonium phosphate, hydroxylapatite [$Ca_5\{(PO_4)_3 OH\}$], orthosilicates, such as lithium orthosilicate, calcium/magnesium orthosilicate, aluminum orthosilicate, iron(II) orthosilicate, iron (III) orthosilicate, magnesium orthosilicate, zinc orthosilicate, zirconium(III) orthosilicate and zirconium(IV) orthosilicate, metasilicates, such as lithium metasilicate, calcium/magnesium metasilicate, calcium metasilicate, magnesium metasilicate, and zinc metasilicate, phyllosilicates, such as sodium aluminum silicate and sodium magnesium silicate, especially in spontaneously delaminating form, such as, for example, Optigel® SH (trademark of Südchemie AG), Saponit® SKS-20 and Hektorit® SKS 21 (trademarks of Hoechst AG), and Laponite® RD and Laponite® GS (trademarks of Laporte Industries Ltd.), aluminates, such as lithium aluminate, calcium aluminate, and zinc aluminate, borates, such as magnesium metaborate and magnesium orthoborate, oxalates, such as calcium oxalate, zirconium(IV) oxalate, magnesium oxalate, zinc oxalate, and aluminum, oxalate, tartrates, such as calcium tartrate, acetylacetonates, such as a aluminum acetylacetonate and iron(III) acetylacetonate, salicylates, such as aluminum salicylate, citrates, such as calcium citrate, iron(II) citrate, and zinc citrate, palmitates, such as aluminum palmitate, calcium palmitate, and magnesium palmitate, stearates, such as aluminum stearate, calcium stearate, magnesium stearate, and zinc stearate, laurates, such as calcium laurate, linoleates, such as calcium linoleate, and oleates, such as calcium oleate, iron(II) oleate, and zinc oleate.

As an essential semimetal compound which can be used in accordance with the invention, mention may be made of amorphous silicon dioxide and/or silicon dioxide present in different crystal structures. Silicon dioxide suitable in accordance with the invention is commercially available and can be obtained, for example, as Aerosil® (trademark of Degussa AG), Levasil® (trademark of Bayer AG), Ludox® (trademark of DuPont), Nyaco® and Bindzil® (trademarks of Akzo-Nobel) and Snowtex® (trademark of Nissan Chemical industries, Ltd.). Nonmetal compounds suitable in accordance with the invention are, for example, colloidal graphite and diamond.

Particularly suitable finely divided inorganic solids are those whose solubility in water at 20° C. and 1 bar (absolute) is 1 g/l, preferably $\leq 0.1$ g/l and, in particular, $\leq 0.01$ g/l. Particular preference is given to compounds selected from the group comprising silicon dioxide, aluminum oxide, tin(IV) oxide, yttrium(III) oxide, cerium(IV) oxide, hydroxyaluminum oxide, a calcium carbonate, magnesium carbonate, calcium orthophosphate, magnesium orthophosphate, calcium metaphosphate, magnesium metaphosphate, calcium pyrophosphate, magnesium pyrophosphate, orthosilicates, such as lithium orthosilicate, calcium/magnesium orthosilicate, aluminum orthosilicate, iron(II) orthosilicate, iron(III) orthosilicate, magnesium orthosilicate, zinc orthosilicate, zirconium(III) orthosilicate and zirconium(IV) orthosilicate, metasilicates, such as lithium metasilicate, zinc metasilicate, phyllosilicates, such as sodium aluminum silicate and sodium magnesium silicate, especially in spontaneously delaminating form, such as, for example, Optigel® SH Saponit® SKS-20 and Hektorit® SKS 21 and Laponite® RD and Laponite® GS, iron(II) oxide, iron (III) oxide, iron(II/III) oxide, titanium dioxide, hydroxylapatite, zinc oxide, and zinc sulfide.

Preferably the at least one finely divided inorganic solid is selected from the group comprising silicon dioxide, aluminum oxide, hydroxyaluminum oxide, calcium carbonate, magnesium carbonate, calcium orthophosphate, magnesium orthophosphate, iron(II) oxide, iron(III) oxide, iron(II/III) oxide, tin(IV) oxide, cerium(IV) oxide, yttrium(III) oxide, titanium dioxide, hydroxylapatite, zinc oxide and zinc sulfide.

Particular preference is given to silicon compounds, such as pyrogenic and/or colloidal silica, silicon dioxide sols and/or phyllosilicates. Preferably these silicon compounds have an electrophoretic nobility having a negative sign.

In the processes of the invention it is also possible to use with advantage the commercially available compounds of the Aerosil®, Levasil®, Ludox®, Nyacol® and Bindzil® grades (silicon dioxide), Disperal® grades (hydroxyaluminum oxide), Nyacol® AL grades (aluminum oxide), Hombitec® grades (titanium dioxide), Nyacol® SN grades (tin(IV) oxide), Nyacol®YTTRIA grades (yttrium(III) oxide), Nyacol® CEO2 grades (cerium(IV) oxide), and Sachtotec® grades (zinc oxide).

The finely divided inorganic solids which can be used to prepare the composite particles have particles which, dispersed in the aqueous reaction medium, have a particle diameter of $\leq 100$ nm. Finely divided inorganic solids used successfully are those whose dispersed particles have a particle diameter >0 nm but $\leq 90$ nm, $\leq 80$ nm, $\leq 70$ nm, $\leq 60$ nm, $\leq 50$ nm, $\leq 40$ nm $\leq 30$ nm or $\leq 10$ nm and all values in between. With advantage, finely divided inorganic solids are used which have a particle diameter ≦50 nm. The particle diameters are determined by the analytical ultracentrifuge method.

The obtainability of finely divided solids is known in principle to the skilled worker and they are obtained, for example, by precipitation reactions or chemical reactions in the gas phase (cf. E. Matijevic, Chem. Mater. 5 (1993) pages 412 to 426; Ullmann's Encyclopedia of industrial Chemistry, Vol. A 23, pages 583 to 660, Verlag Chemie, Weinheim, 1992; D. F. Evans, H. Wennerström in The Colloidal Domain, pages 363 to 405, Verlag Chemie Weinheim, 1994, and R. J. Hunter in Foundations of Colloid Science, Vol. I, pages 10 to 17, Clarendon Press, Oxford, 1991).

The stable dispersion of solids is often prepared directly during synthesis of the finely divided inorganic solids in aqueous medium or else by dispersing the finely divided inorganic solid into the aqueous medium. Depending on the way in which said finely divided inorganic solids are prepared, this is done either directly, in the case, for example, of precipitated or pyrogenic silicon dioxide, aluminum oxide, etc., or by using appropriate auxiliary devices, such as dispersers or ultrasound sonotrodes, for example.

Finely divided inorganic solids suitable with advantage for preparing the aqueous composite-particle dispersions are those whose aqueous dispersion of solids, at an initial solids concentration of ≧1% by weight, based on the aqueous dispersion of the finely divided inorganic solid, still comprises in dispersed form one hour after its preparation or by stirring or shaking up the sedimented solids, without further stirring or shaking, more than 90% by weight of the originally dispersed solid and whose dispersed solid particles have a diameter ≦100 nm. Initial solids concentrations ≦60% by weight are customary. With advantage, however, it is also possible to use initial solids concentrations ≦55% by weight, ≦50% by weight, ≦45% by weight, ≦40% by weight, ≦35% by weight, ≦30% by weight, ≦25% by weight, ≦20% by weight, ≦15% by weight, ≦10% by weight and ≧2% by weight, ≧3% by weight, ≧4% by weight or ≧5% by weight, based in each case on the aqueous dispersion of the finely divided inorganic solid, and all values in between. Per 100 parts by weight of monomer mixture, use is made frequently of from 1 to 1000, generally from 5 to 300, and often from 10 to 200 parts by weight of said at least one finely divided inorganic solid in the preparation of aqueous composite-particle dispersions.

For preparing the aqueous composite-particle dispersions, dispersants used are generally those which maintain not only the finely divided inorganic solid particles but also the monomer droplets and the resulting composite particles in disperse distribution in the aqueous phase and so ensure the stability of the aqueous dispersions of composite particles that are produced. Suitable dispersants include both the protective colloids commonly used to carry out free-radical aqueous emulsion polymerizations, and emulsifiers.

An exhaustive description of suitable protective colloids is given in Houben-Weyl, Methoden der organischen Chemie, Volume XIV/1, Makromolekulare Stoffe, [Macromolecular compounds] Georg-Thieme-Verlag, Stuttgart, 1961, pages 411 to 420.

Examples of suitable neutral protective colloids are polyvinyl alcohols, polyalkylene glycols, cellulose derivatives, starch derivatives, and gelatin derivatives.

Suitable anionic protective colloids, i.e., protective colloids whose dispersive component has at least one negative electrical charge, are for example polyacrylic acids and polymethacrylic acids and their alkali metal salts, copolymers comprising acrylic acid, methacrylic acid, 2-acrylamido-2-methylpropanesulfonic acid, 4-styrenesulfonic acid and/or maleic anhydride, and the alkali metal salts of such copolymers, and also alkali metal salts of sulfonic acids of high molecular mass compounds such as, for example, polystyrene.

Suitable cationic protective colloids, i.e., protective colloids whose dispersive component has at least one positive electrical charge, are, for example, the N-protonated and/or N-alkylated derivatives of homopolymers and copolymers comprising N-vinylpyrrolidone, N-vinylcaprolactam, N-vinylcarbazole, 1-vinylimidazole, 2-vinylimidazole, 2-vinylpyridine, 4-vinylpyridine, acrylamide, methacrylamide, amino-functional acrylates, methacrylates, acrylamides and/or methacrylamides.

It is of course also possible to use mixtures of emulsifiers and/or protective colloids. As dispersants it is common to use exclusively emulsifiers, whose relative molecular weights, unlike those of the protective colloids, are usually below 1500. Where mixtures of surface-active substances are used the individual components must of course be compatible with one another, which in case of doubt can be checked by means of a few preliminary experiments. An overview of suitable emulsifiers is given in Houben-Weyl, Methoden der organischen Chemie, Volume XIV/1, Makromolekulare Stoffe [Macromolecular substances], Georg-Thieme-Verlag, Stuttgart, 1961, pages 192 to 208.

Customary nonionic emulsifiers are for example ethoxylated mono-, di- and tri akylphenols (EO units: 3 to 50, alkyl: $C_4$ to $C_{12}$) and ethoxylated fatty alcohols (EO units: 3 to 80; alkyl: $C_8$ to $C_{36}$). Examples thereof are the Lutensol® A grades ($C_{12}C_{14}$ fatty alcohol ethoxylates, EO units: 3 to 8), Lutensol® AO grades $C_{13}C_{15}$ oxo alcohol ethoxylates, EO units: 3 to 30), Lutensol® AT grades ($C_{16}C_{18}$ fatty alcohol ethoxylates, EO units: 11 to 80), Lutensol® ON grades ($C_{10}$ oxo alcohol ethoxylates, EO units: 3 to 11), and the Lutensol® TO grades ($C_{13}$ oxo alcohol ethoxylates, EO units: 3 to 20) from BASF AG.

Customary anionic emulsifiers are, for example, alkali metal salts and ammonium salts of alkyl sulfates (alkyl: $C_8$ to $C_{12}$), of sulfuric monoesters with ethoxylated alkanols (EO units: 4 to 30, alkyl: $C_{12}$ to $C_{18}$) and with ethoxylated alkylphenols (EO units: 3 to 50, alkyl: $C_4$ to $C_{12}$), of alkylsulfonic acids (alkyl: $C_{12}$ to $C_{18}$) and of alkylarylsulfonic acids (alkyl: $C_9$ to $C_{18}$).

Compounds which have proven suitable as further anionic emulsifiers are, furthermore, compounds of the general formula I

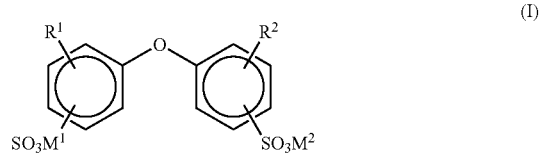

(I)

in which $R^1$ and $R^2$ are hydrogens or $C_4$ to $C_{24}$ alkyl but are not both simultaneously hydrogens and $M^1$ and $M^2$ can be alkali metal ions and/or ammonium ions. In the general formula I, $R^1$ and $R^2$ are preferably linear or branched alkyl radicals of 6 to 18 carbons, especially 6, 12 and 16 carbons, or —H, $R^1$ and $R^2$ not both being hydrogens simultaneously. $M^1$ and $M^2$ are preferably sodium, potassium or ammonium, particular preference being given to sodium. Particularly advantageous compounds I are those in which $M^1$ and $M^2$ are sodium, $R^1$ is a branched alkyl radical of 12 carbons, and $R^2$ is a hydrogen or R¹. Frequently, use is made of technical-grade mixtures containing a fraction of from 50 to 90% by weight of the monoalkylated product; for example, Dowfax® 2A1 (trademark of Dow Chemical Company). The compounds I are widely known, from U.S. Pat. No. 4,269,749, for example, and are obtainable commercially.

Suitable cation active emulsifiers are generally $C_6$-$C_{18}$ alkyl, aralkyl or heterocyclyl-containing primary secondary tertiary or quaternary ammonium salts, alkanolammonium salts, pyridinium salts, imidazolinium salts, oxazolinium salts, morpholinium salts, thiazolinium salts, and salts of amine oxides, quinolinium salts, isoquinolinium salts, tropylium salts, sulfonium salts, and phosphonium salts. Examples that may be mentioned include dodecylammonium acetate or the corresponding hydrochloride, the chlorides or acetates of the various paraffinic acid 2-(N,N,N-trimethylammonium ethyl esters, N-cetylpyridinium chloride, N-laurylpyridinium sulfate, and also N-cetyl-N,N,N-trimethylammonium bromide, N-dodecyl-N,N,N-trimethylammonium bromide, N-octyl-N,N,N-trimethylammonium bromide, N,N-distearyl-N,N-dimethylammonium chloride, and the gemini surfactant N,N'-(lauryidimethyl)ethylenediamine dibromide. Many further examples can be found in H. Stache, Tensid-Taschenbuch, Carl-Hanser-Verlag, Munich, Vienna, 1981, and in McCutcheon's, Emulsifiers & Detergents, MC Publishing Company, Glen Rock, 1989.

Frequently used for preparing the aqueous composite-particle dispersions is between 0.1% to 10%, often 0.5% to 7.0% and frequently 1.0% to 5.0% by weight of dispersants, based in each case on the total amount of aqueous composite-particle dispersion. Preference is given to using emulsifiers, especially nonionic and/or anionic emulsifiers. In the process disclosed according to WO 03000760, anionic, cationic, and nonionic emulsifiers are used as dispersants.

It is essential to the process that for preparing the aqueous composite-particle dispersion of the invention a monomer mixture is used which is composed of ethylenically unsaturated monomers A and, to an extent >0 and ≦10% by weight, at least one ethylenically unsaturated monomer B containing an epoxide group (epoxide monomer).

Suitable monomers A include, in particular, ethylenically unsaturated monomers which are easy to polymerize free-radically, such as, for example, ethylene, vinylaromatic monomers, such as styrene, α-ethylstyrene, o-chlorostyrene or vinyltoluenes, esters of vinyl alcohol and $C_1$-$C_{18}$ monocarboxylic acids, such as vinyl acetate, vinyl propionate, vinyl n-butyrate, vinyl laurate and vinyl stearate, esters of preferably $C_3$-$C_6$ α,β-monoethylenically unsaturated mono- and dicarboxylic acids, such as especially acrylic acid, methacrylic acid, maleic acid, fumaric acid and itaconic acid, with generally $C_1$-$C_{12}$, preferably $C_1$-$C_8$ and, in particular, $C_1$-$C_4$ alkanols, such as, in particular, methyl, ethyl, n-butyl, isobutyl and 2-ethylhexyl acrylate and methacrylate, dimethyl maleate and di-n-butyl maleate, nitriles of α,β-monoethylenically unsaturated carboxylic acids, such as acrylonitrile, and $C_{4-8}$ conjugated dienes, such as 1,3-butadiene and isoprene. These monomers generally constitute the principal monomers, which, based on the overall amount of the monomers A to be polymerized by the process of the invention, normally account for a proportion of ≧50%, ≧80% or ≧90% by weight. As a general rule, these monomers are only of moderate to poor solubility in water under standard conditions [20° C., 1 bar (absolute)].

Further monomers A which customarily increase the internal strength of the films of the polymer matrix normally contain at least one hydroxyl, N-methylol or carbonyl group or at least two nonconjugated ethylenically unsaturated double bonds. Examples here are monomers having two vinyl radicals, monomers having two vinylidene radicals, and monomers having two alkenyl radicals. Particularly advantageous in this context are the diesters of dihydric alcohols with α,β-monoethylenically unsaturated monocarboxylic acids, among which acrylic and methacrylic acid are preferred. Examples of this kind of monomer having two nonconjugated ethylenically unsaturated double bonds are alkylene glycol diacrylates and dimethacrylates such as ethylene glycol diacrylate, 1,2-propylene glycol diacrylate, 1,3-propylene glycol diacrylate, 1,3-butylene glycol diacrylate, 1,4-butylene glycol diacrylates and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate, and also divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate, and triallyl isocyanurate. Of particular importance in this context are also the methacrylic and acrylic $C_1$-$C_8$ hydroxyalkyl esters, such as n-hydroxyethyl, n-hydroxypropyl or n-hydroxybutyl acrylate and methacrylate, and compounds such as diacetoneacrylamide and acetylacetoxyethyl acrylate and methacrylate. In accordance with the invention, the aforementioned monomers, based on the total amount of the monomers A to be polymerized, are used in amounts of up to 5%, in particular 0.1% to 3%, and preferably 0.5% to 2% by weight, for the polymerization.

As monomers A it is also possible to use ethylenically unsaturated monomers comprising siloxane groups, such as the vinyltrialkoxysilanes, vinyltrimethoxysilane, for example, alkylvinyldialkoxysilanes, acryloyloxyalkyltrialkoxysilanes, or methacryloyloxyalkyltrialkoxysilanes, such as acryloyloxyethyltrimethoxysilane, methacryloyloxyethyltrimethoxysilane, acryloyloxypropytrimethoxysilane or methacryloyloxypropyltrimethoxysilane, for example. These monomers are used in total amounts of up to 5%, frequently from 0.01% to 3%, and often from 0.05% to 1% by weight, based in each case on the total amount of the monomers A. Advantageously in accordance with the invention, aforementioned monomers A comprising siloxane groups are used in total amounts of from 0.01% to 5%, in particular from 0.01% to 3%, and preferably from 0.05% to 1% by weight, based in each case on the total amount of the monomers A to be polymerized. It is important that the aforementioned ethylenically unsaturated monomers comprising siloxane groups can be metered in before, in parallel with, or after the other monomers A.

Besides these, it is possible additionally to use as monomers A those ethylenically unsaturated monomers E which either comprise at least one acid group and/or its corresponding anion or those ethylenically unsaturated monomers F which comprise at least one amino, amido, ureido or N-heterocyclic group and/or the N-protonated or N-alkylated ammonium derivatives thereof. Based on the total amount of the monomers A to be polymerized, the amount of monomers E or monomers F, respectively, is up to 10% by weight, often from 0.1 to 7% by weight, and frequently from 0.2 to 5% by weight.

Monomers E used are ethylenically unsaturated monomers containing at least one acid group. The acid group may, for example, be a carboxylic, sulfonic, sulfuric, phosphoric and/or phosphonic acid group. Examples of such monomers E are acrylic acid, methacrylic acid, maleic acid, fumaric acid, itaconic acid, crotonic acid, 4-styrenesulfonic acid, 2-methacryloyloxyethylsulfonic acid, vinylsulfonic acid, and vinylphosphonic acid, and also phosphoric monoesters of n-hydroxyalkylacrylates and n-hydroxyalkyl methacrylates, such as phosphoric monoesters of hydroxyethyl acrylate, n-hydroxypropyl acrylate, n-hydroxybutyl acrylate and hydroxyethyl methacrylate, n-hydroxypropyl methacrylate or n-hydroxybutyl methacrylate, for example. In accordance with the invention, however, it is also possible to use the ammonium and alkali metal salts of the aforementioned ethylenically unsaturated monomers containing at least one acid group. Particularly preferred alkali metals are sodium and potassium. Examples of such compounds are the ammonium, sodium, and potassium salts of acrylic acid, methacrylic acid, maleic acid, fumaric acid, itaconic acid, crotonic acid, 4-styrenesulfonic acid, 2-methacryloyloxyethylsulfonic acid, vinylsulfonic acid, and vinylphosphonic acid, and also the mono- and di-ammonium, -sodium and -potassium salts of the phosphoric monoesters of hydroxyethyl acrylate, n-hydroxypropyl acrylate, n-hydroxybutyl acrylate and hydroxyethyl methacrylate, n-hydroxypropyl methacrylate or n-hydroxybutyl methacrylate.

Preference is given to using acrylic acid, methacrylic acid, maleic acid, fumaric acid, itaconic acid, crotonic acid, 4-styrenesulfonic acid, 2-methacryloyloxyethylsulfonic acid, vinylsulfonic acid, and vinylphosphonic acid as monomers E.

As monomers F, use is made of ethylenically unsaturated monomers which comprise at least one amino, amido, ureido or N-heterocyclic group and/or the N-protonated or N-alkylated ammonium derivatives thereof.

Examples of monomers F which comprise at least one amino group are 2-aminoethyl acrylate, 2-aminoethyl methacrylate, 3-aminopropyl acrylate, 3-aminopropyl methacrylate, 4-amino-n-butyl acrylate, 4-amino-n-butyl methacrylate, 2-(N-methylamino)ethyl acrylate, 2-(N-methylamino)ethyl methacrylate, 2-(N-ethylamino)ethyl acrylate, 2-(N-ethylamino)ethyl methacrylate, 2-(N-n-propylamino)ethyl acrylate, 2-(N-n-propylamino)ethyl methacrylate, 2-N-iso-propylamino)ethyl acrylate, 2-(N-isopropylamino)ethyl methacrylate, 2-(N-tert-butylamino)ethyl acrylate, 2-(N-ter-butylamino)ethyl methacrylate (available commercially, for example, as Norsocryl® TBAEMA from Elf Atochem), 2-(N,N-dimethylamino)ethyl acrylate (available commercially, for example, as Norsocryl® ADAME from Elf Atochem), 2-(N,N-dimethylamino)ethyl methacrylate (available commercially, for example, as Norsocryl® MADAME from Elf Atochem), 2-(N,N-diethylamino)ethyl acrylate, 2-(N,N-diethylamino)ethyl methacrylate, 2-(N,N-di-n-propylamino) ethyl acrylate, 2-(N,N-di-n-propylamino)ethyl methacrylate, 2-(N,N-di-iso-propylamino)ethyl acrylate, 2-(N,N-di-iso-propylamino)ethyl methacrylate, 3-(N-methylamino)propyl acrylate, 3-(N-methylamino)propyl methacrylate, 3-(N-ethylamino)propyl acrylate, 3-(N-ethylamino)propyl methacrylate, 3-(N-n-propylamino)propyl acrylate, 3-(N-n-propylamino)propyl methacrylate, 3-(N-iso-propylamino)propyl acrylate, 3-(N-isopropylamino)propyl methacrylate, 3-(N-tert-butylamino)propyl acrylate, 3-(N-tert-butylamino)propyl methacrylate, 3-(N,N-dimethylamino)propyl acrylate, 3-(N,N-dimethylamino)propyl methacrylate, 3-(N,N-diethylamino)propyl acrylate, 3-(N,N-diethylamino)propyl methacrylate, 3-(N,N-di-n-propylamino)propyl acrylate, 3-(N,N-di-n-propylamino)propyl methacrylate, 3-(N,N-di-iso-propylamino)propyl acrylate, and 3-(N,N-di-iso-propylamino)propyl methacrylate.

Examples of monomers F which comprise at least one amido group are acrylamide, methacrylamide, N-methylacrylamide, N-methylmethacrylamide, N-ethylacrylamide, N-methylmethacrylamide, N-n-propylacrylamide, N-n-propylmethacrylamide, N-isopropylacrylamide, N-iso-propylmethacrylamide, N-tert-butylacrylamide, N-tert-butylmethacrylamide, N,N-dimethylacrylamide, N,N-dimethylmethacrylamide, N,N-diethylacrylamide, N,N-diethylmethacrylamide, N,N-di-n-propylacrylamide, N,N-di-n-propylmethacrylamide, N,N-di-iso-propylacrylamide, N,N-di-iso-propylmethacrylamide, N,N-di-n-butyacrylamide, N,N-di-n-butylmethacylamide, N-(3-N',N'-dimethylaminopropyl)methacrylamide, diacetoneacrylamide, N,N'-methylenebisacrylamide, N-(diphenylmethyl) acrylamide, N-cyclohexylacrylamide, and also N-vinylpyrrolidone and N-vinylcaprolactam.

Examples of monomers F which comprise at least one ureido group are N,N'-divinylethyleneurea and 2-(1-imidazolin-2-onyl)ethyl methacrylate (available commercially, for example, as Norsocryl® 100 from Elf Atochem).

Examples of monomers F which comprise at least one N-heterocyclic group are 2-vinylpyridine, 4-vinylpyridine, 1-vinylimidazole, 2-vinylimidazole, and N-vinylcarbazole.

Preference is given to using as monomers F the following compounds: 2-vinylpyridine, 4-vinylpyridine, 2-vinylimidazole, 2-(N,N-dimethylamino)ethyl acrylate, 2-(N,N-dimethylamino)ethyl methacrylate, 2-(N,N-diethylamino)ethyl acrylate, 2-(N,N-diethylamino)ethyl methacrylate, 2-(N-tert-butylamino)ethyl methacrylate, N-(3-N',N'-dimethylaminopropyl)methacrylamide, and 2-(1-imidazolin-2-onyl)ethyl methacrylate.

Depending on the pH of the aqueous reaction medium, it is also possible for some or all of the aforementioned nitrogen-containing monomers F to be present in the N-protonated quaternary ammonium form.

Examples that may be mentioned as monomers F which have a quaternary alkylammonium structure on the nitrogen include 2-(N,N,N-trimethylammonium)ethyl acrylate chloride available commercially, for example, as Norsocryl® ADAMQUAT MC 80 from Elf Atochem), 2-(N,N,N-trimethylammonium)ethyl methacrylate chloride (available commercially, for example, as Norsocryl® MADQUAT MC 75 from Elf Atochem), 2-(N-methyl-N,N-diethylammonium) ethyl acrylate chloride, 2-(N-methyl-N,N-diethylammonium)ethyl methacrylate chloride, 2-(N-methyl-N,N-dipropylammonium)ethyl acrylate chloride, 2-(N-methyl-N,N-dipropylammonium)ethyl methacrylate, 2-(N-benzyl-N,N-dimethylammonium)ethyl acrylate chloride (available commercially, for example, as Norsorcryl® ADAMQUAT BZ 80 from Elf Atochem), 2-(N-benzyl-N,N-dimethylammonium)ethyl methacrylate chloride (available commercially, for example, as Norsocryl® MADQUAT BZ 75 from Elf Atochem), 2-(N-benzyl-N,N-diethylammonium)ethyl acrylate chloride, 2-(N-benzyl-N,N-diethylammonium)ethyl methacrylate chloride, 2-(N-benzyl-N,N-dipropylammonium)ethyl acrylate chloride, 2-(N-benzyl-N,N-dipropylammonium)ethyl methacrylate chloride, 3-(N,N,N-trimethylammonium)propyl acrylate chloride, 3-(N,N,N-trimethylammonium)propyl methacrylate chloride, 3-(N-methyl-N,N-diethylammonium)propyl acrylate chloride, 3-(N-methyl-N,N-diethylammonium)propyl methacrylate chloride, 3-(N-methyl-N,N-dipropylammonium)propyl acrylate chloride, 3-(N-methyl-N,N-dipropylammonium) propyl methacrylate chloride, 3-(N-benzyl-N,N-dimethylammonium)propyl acrylate chloride, 3-(N-benzyl-N,N-dimethylammonium)propyl methacrylate chloride, 3-(N-benzyl-N,N-diethylammonium)propyl acrylate chloride, 3-(N-benzyl-N,N-diethylammonium)propyl methacrylate chloride, 3-(N-benzyl-N,N-dipropylammonium)propyl acrylate chloride, and 3-(N-benzyl-N,N-dipropylammonium) propyl methacrylate chloride. It is of course also possible to use the corresponding bromides and sulfates instead of the chlorides named.

Preference is given to using 2-(N,N,N-trimethylammonium)ethyl acrylate chloride, 2-(N,N,N-trimethylammonium)ethyl methacrylate chloride, 2-(N-benzyl-N,N-dimethylammonium)ethyl acrylate chloride, and 2-(N-benzyl-N,N-dimethylammonium)ethyl methacrylate chloride.

It is of course also possible to use mixtures of the aforementioned ethylenically unsaturated monomers E and/or F.

It is important that, in the presence of dispersed solid particles having an electrophoretic mobility having a negative sign, some or all of said at least one anionic dispersant may be replaced by the equivalent amount of at least one monomer E and, in the presence of dispersed solid particles having an electrophoretic mobility having a positive sign, some or all of said at least one cationic dispersant may be replaced by the equivalent amount of at least one monomer F.

With particular advantage the composition of the monomers A is chosen such that polymerization of them alone would result in an addition polymer having a glass transition temperature $\leq 100°$ C., preferably $\leq 60°$ C., in particular $\leq 40°$ C., and frequently $\geq -30°$ C. and often $\geq -20°$ C. or $\geq -100°$ C.

The glass transition temperature is normally determined in accordance with DIN 53 765 (Differential Scanning Calorimetry, 20 min, midpoint measurement).

According to Fox (T. G. Fox, Bull. Am. Phys. Soc. 1956 [Ser. II] 1, page 123, and in accordance with Ullmann's Encyclopädie der technischen Chemie, Vol. 19, page 18, 4th edition, Verlag Chemie, Weinheim, 1980) it is the case that for the glass transition temperature $T_g$ of copolymers with no more than low degrees of crosslinking, in good approximation:

$$1/T_g = x^1/T_g^1 + x^2/T_g^2 + \ldots x^n/T_g^n,$$

where $x^1, x^2, \ldots x^n$ are the mass fractions of the monomers 1, 2, ... n and $T_g^1, T_g^2, \ldots T_g^n$ are the glass transition temperatures of the addition polymers synthesized in each case only from one of the monomers 1, 2, ... n, in degrees Kelvin. The $T_g$ values for the homopolymers of the majority of monomers are known and are listed for example in Ullmann's Encyclopedia of Industrial Chemistry, 5th ed., Vol. A21, page 169, Verlag Chemie, Weinheim, 1992; further sources of homopolymer glass transition temperatures are formed, for example, by J. Brandrup, E. H. Immergut, Polymer Handbook, 1st Ed., J. Wiley, New York, 1966; 2nd Ed. J. Wiley, New York, 1975 and 3rd Ed. J. Wiley, New York, 1989.

As monomer B (epoxide monomer) it is possible to use all ethylenically unsaturated compounds which contain at least one epoxide group. In particular, however, the at least one epoxide monomer is selected from the group comprising 1,2-epoxybut-3-ene, 1,2-epoxy-3-methylbut-3-ene, glycidyl acrylate (2,3-epoxypropyl acrylate), glycidyl methacrylate (2,3-epoxypropyl methacrylate), 2,3-epoxybutyl acrylate, 2,3-epoxybutyl methacrylate, 3,4-epoxybutyl acrylate, and 3,4-epoxybutyl methacrylate, and also the corresponding alkoxylated, especially ethoxylated and/or propoxylated, glycidyl acrylates and glycidyl methacrylates, such as they are disclosed, for example, in U.S. Pat. No. 5,763,629. In accordance with the invention it is of course also possible to employ mixtures of epoxide monomers. Preference is given to using glycidyl acrylate and/or glycidyl methacrylate as epoxide monomers.

Based on the total monomer amount, the amount of epoxide monomer is >0 and $\leq 10\%$ by weight. Frequently the total amount of epoxide monomer is $\geq 0.01\%$, $\geq 0.1\%$ or $\geq 0.5\%$, often $\geq 0.8\%$, $\geq 1\%$ or $\geq 1.5\%$, and/or $\leq 8\%$, $\leq 7\%$ or $\leq 6\%$, and often $\leq 5\%$, $\leq 4\%$ or $\leq 3\%$, by weight, based in each case on the total monomer amount. The amount of epoxide monomers is preferably $\geq 0.1\%$ and $\leq 5\%$ by weight and in particular preferably $\geq 0.5\%$ and $\leq 3\%$ by weight, based in each case on the total monomer amount.

Accordingly the monomer mixture for polymerization is composed preferably of $\geq 95\%$ and $\leq 99.9\%$ by weight, and more preferably $\geq 97\%$ and $\leq 99.5\%$ by weight, of monomers A and $\geq 0.1\%$ and $\leq 5\%$ by weight and, more preferably, $\geq 0.5\%$ and $\leq 3\%$ by weight of epoxide monomers.

With advantage the monomer mixture for polymerization is chosen such that the addition polymer obtained therefrom has a glass transition temperature $\leq 100°$ C., preferably $\leq 60°$ C. or $\leq 40°$ C., in particular $\leq 30°$ or $\leq 20°$ C., and frequently $\geq -30°$ C. or $\geq -15°$ C. and often $\geq -10°$ C. or $\geq -5°$ C., and therefore the aqueous composite-particle dispersions in the presence of customary film-forming assistants, if appropriate—can easily be converted into the polymer films comprising the finely divided inorganic solids (composite films).

Initiators suitable for preparing the aqueous composite-particle dispersion of the invention by free-radical polymerization include all those free-radical polymerization initiators capable of triggering a free-radical aqueous emulsion polymerization. The initiators can in principle comprise both peroxides and azo compounds. Redox initiator systems are also suitable, of course. Peroxides used can n principle be inorganic peroxides, such as hydrogen peroxide or peroxodisulfates, such as the mono- or di-alkali metal salts or ammonium salts of peroxodisulfuric acid, examples being the mono- and di-sodium and -potassium salts, or ammonium salts, thereof, or else organic peroxides, such as alkyl hydroperoxides, examples being tert-butyl, p-mentyl and cumyl hydroperoxide, and also dialkyl or diary peroxides, such as di-tert-butyl peroxide or dicumyl peroxide Azo compounds used are primarily 2,2'-azobis(isobutyronitrile), 2,2'-azobis(2,4-dimethylvaleronitrile), and 2,2'-azobis(amidinopropyl) dihydrochloride (AIBA, corresponding to V-50 from Wako Chemicals). Suitable oxidizing agents for redox initiator systems are essentially the abovementioned peroxides. Corresponding reducing agents used can be compounds of sulfur with a low oxidation state, such as alkali metal sulfites, e.g., potassium and/or sodium sulfite, alkali metal hydrogen sulfites, e.g., potassium and/or sodium hydrogen sulfite, alkali metal metabisulfites, e.g., potassium and/or sodium metabisulfite, formaldehyde-sulfoxylates, e.g., potassium and/or sodium formaldehyde-sulfoxylate, alkali metal salts, especial y potassium salts and/or sodium salts, of aliphatic sulfinic acids, and alkali metal hydrogen sulfides, e.g., potassium and/or sodium hydrogen sulfide, salts, of polyvalent metals, such as iron(II) sulfate, iron(II) ammonium sulfate, iron(II) phosphate, enediols, such as dihydroxymaleic acid, benzoin and/or ascorbic acid, and reducing saccharides, such as sorbose, glucose, fructose and/or dihydroxyacetone. In general, the amount of the free-radical polymerization initiator used, based on the total amount of the monomer mixture, is from 0.1 to 5% by weight.

Suitable reaction temperatures for the free-radical aqueous polymerization reaction in the presence of the finely divided inorganic solid embrace the entire range from 0 to 170° C. In general, the temperatures used are from 50 to 120° C., frequently from 60 to 110° C. and often $\geq 70$ to 100° C. The free-radical aqueous emulsion polymerization can be conducted at a pressure less than, equal to or greater than 1 bar (absolute), and the polymerization temperature may exceed 100° C. and can be up to 170° C. Highly volatile monomers such as ethylene, butadiene or vinyl chloride are preferably polymerized under increased pressure. In this case she pressure can adopt values of 1.2, 1.5, 2, 5, 10 or 15 bar or higher.

When emulsion polymerizations are conducted under subatmospheric pressure, pressures of 950 mbar, frequently 900 mbar and often 850 mbar (absolute) are established. The free-radical aqueous polymerization is advantageously conducted at 1 bar (absolute) under an inert gas atmosphere, such as under nitrogen or argon, for example.

The aqueous reaction medium may in principle also include, to a minor extent, water-soluble organic solvents, such as methanol, ethanol, isopropanol, butanols, pentanols, or else acetone etc., for example. Preferably, however, the polymerization reaction is conducted in the absence of such solvents.

Besides the abovementioned components, it is also possible, optionally, in the process for preparing the aqueous composite-particle dispersion to use free-radical chain transfer compounds in order to reduce or control the molecular weight of the addition polymers obtainable by the polymerization. Suitable compounds of this type include, essentially, aliphatic and/or araliphatic halogen compounds, such as n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride, benzyl bromide, organic thio compounds, such as primary, secondary or tertiary aliphatic thiols, such as ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and its isomers, n-octanethiol and its isomers, n-nonanethiol and its isomers, n-decanethiol and its isomers, n-undecanethiol and its isomers, n-dodecanethiol and its isomers, n-tridecanethiol and its isomers, substituted thiols, such as 2-hydroxyethanethiol, aromatic thiols, such as benzenethiol, ortho-, meta-, or para-methylbenzenethiol, and also all other sulfur compounds described in Polymer Handbook $3^{rd}$ edition, 1989, J. Brandrup and E. H. Immergut, John Weley & Sons, Section II, pages 133 to 141, and also aliphatic and/or aromatic aldehydes, such as acetaldehyde, propionaldehyde and/or benzaldehyde, unsaturated fatty acids, such as oleic acid, dienes with nonconjugated double bonds, such as divinylmethane, or vinylcyclohexane or hydrocarbons having readily abstractable hydrogen atoms, such as toluene, for example. It is, however, also possible to use mixtures of mutually compatible, abovementioned free-radical chain transfer compounds. The total amount of the free-radical chain transfer compounds used optionally, based on the total amount of the monomers to be polymerized, is generally $\leq 5\%$ by weight, often $\leq 3\%$ by weight, and frequently $\leq 1\%$ by weight.

The aqueous composite-particle dispersions obtainable by the process of the invention normally have a total solids content of from 1% to 70%, frequently from 5% to 65%, and often from 10% to 60%, by weight.

The composite particles obtainable by the process of the invention generally have average particle diameters in the range $\geq 10$ nm and $\leq 1000$ nm, frequently in the range $\geq 50$ nm and $\leq 400$ nm, and often in the range $\geq 100$ nm and $\leq 300$ nm. The determination of the average composite-particle diameters also takes place by the method of analytic ultracentrifugation (cf. S. E. Harding et al., Analytical Ultracentrifugation in Biochemistry and Polymer Science, Royal Society of Chemistry, Cambridge, Great Britain 1992, Chapter 10, Analysis of Polymer Dispersions with an Eight-Cell AUC Multiplexer: High Resolution Particle Size Distribution and Density Gradient Techniques, W. Mächtle, pages 147 to 175). The figures stated correspond to those known as $d_{50}$ values. To form composite films with an increased breaking tension, suitability is possessed advantageously by those composite-particle dispersions whose composite particles have an average diameter $\geq 50$ nm and $\leq 300$ nm, preferably $\leq 200$ nm, and in particular $\leq 150$ nm.

The composite particles obtainable by the process of the invention can have different structures. These composite particles may comprise one or more of the finely divided solid particles. The finely divided solid particles may be completely enveloped by the polymer matrix. It is, however, also possible for some of the finely divided solid particles to be enveloped by the polymer matrix, while some others are disposed on the surface of the polymer matrix. As will be appreciated, it is also possible for a major fraction of the finely divided solid particles to be bound on the surface of the polymer matrix.

The finely divided inorganic solid content of the composite particles obtainable by the process of the invention is normally $\geq 10\%$, preferably $\geq 15\%$, and more preferably $\geq 20\%$, $\geq 25\%$ or $\geq 30\%$ by weight.

The aqueous composite-particle dispersions obtainable in accordance with the invention are advantageously suitable, for example, as binder, for producing a protective coat, as an adhesive or for modifying cement formulations and mortar formulations, The composite particles obtainable by the process of the invention can also be used, in principle, in medical diagnostics and in other medical applications (cf., e.g., K. Mosbach and L. Andersson, Nature 270 (1977), pages 259 to 261; P. L. Kronick, Science 200 (1978), pages 1074 to 1076; and U.S. Pat. No. 4,157,323).

Depending on the planned end use, the aqueous composite-particle dispersions obtainable in accordance with the invention may be mixed with further formulation ingredients, examples being pigments and fillers and/or further customary auxiliaries, such as those known as film-forming assistants, for example, thickeners, defoamers, wetting agents, dispersing assistants, neutralizing agents and/or preservatives.

As pigments it is possible in principle to use all of the white and chromatic pigments that are familiar to the skilled worker.

The most important white pigment, owing to its high refractive index and its high opacity, is titanium dioxide in its various modifications Zinc oxide and zinc sulfide as well, however, are used as white pigments. These white pigments can be used in surface-coated form or uncoated form. In addition, however, use is also made of organic white pigments, such as non-film-forming, hollow polymer particles that are rich in styrene and carboxyl groups and have a particle size of about 300 to 400 nm (known as opaque particles).

For the purpose of the color design—of a coating composition comprising the aqueous composite-particle dispersion obtainable according to the invention, for example—it is possible, besides white pigments, to use any of a very wide variety of chromatic pigments familiar to the skilled worker, examples being the somewhat more favorably priced inorganic oxides and/or sulfides of iron, of cadmium, of chromium and of lead, lead molybdate, cobalt blue or carbon black, and also the somewhat more expensive organic pigments, examples being phthalocyanines, azo pigments, quinacridones, perylenes or carbazoles.

Fillers used are substantially inorganic materials having a lower refractive index than the pigments. The pulverulent fillers are frequently naturally occurring minerals, such as calcite, chalk, dolomite, kaolin, talc, mica, deatomaceous earth, baryte, quartz or talc/chlorite intergrowths, for example, and also synthetically prepared inorganic compounds, such as precipitated calcium carbonate, calcined kaolin or barium sulfate, and also pyrogenic silica. A preferred filler used is calcium carbonate in the form of crystalline calcite or of amorphous chalk.

Film-forming assistants, also calcd coalescence assistants, are used in order to allow even those addition polymers comprised in the composite particles and having a glass transition temperature of more than 20° C. to form films reliably at room temperature. These film-forming assistants enhance the formation of films of the polymeric binders when the coating is being formed, and are subsequently released from the coating to the environment as a function of the ambient temperature, the atmospheric humidity, and the boiling point, and also of the resultant vapor pressure. The film-forming assistants known to the skilled worker include, for example, white spirit, water-miscible glycol ethers, such as butylglycol, butyldiglycol, dipropylene glycol monomethyl ether or dipropylene glycol butyl ether, and glycol acetates, such as butylglycol acetate, butyldiglycol acetate, and additionally esters of carboxylic acids and dicarboxylic acids, such as 2-ethylhexyl benzoate, 2,2,4-trimethylpentane-1,3-diol monoisobutyrate or tripropylene glycol monoisobutyrate.

In order to achieve optimum adjustment of the rheology of aqueous formulation compositions comprising the aqueous composite-particle dispersions of the invention, during preparation, handling, storage, and application, use is frequently made of what are known as thickeners or rheological additives, as a formulating ingredient. The skilled worker is aware of a multiplicity of different thickeners, examples being organic thickeners, such as xanthan thickeners, guar thickeners (polysaccharides), carboxymethylcellulose, hydroxyethylcellulose, methylcellulose, hydroxypropylmethylcellulose, ethylhydroxyethylcellulose (cellulose derivatives), alkali-swellable dispersions (acrylate thickeners) or hydrophobically modified, polyether-based polyurethanes (polyurethane thickeners), or inorganic thickeners, such as bentonite, hectorite, smectite, aftapulgite (Bentone), and also titanates or zirconates (metal organyls).

In order to avoid foaming during preparation, handling, storage, and application of the aqueous formulation compositions obtainable in accordance with the invention, use is made of what are called defoamers. The defoamers are familiar to the skilled worker. They include, essentially, mineral oil defoamers and silicone oil defoamers. Defoamers, especially those highly active silicone defoamers, generally require very careful selection and metering, since they can lead to surface defects (craters, dimples, etc.) in the coating. What is significant is that through the addition of very finely divided hydrophobic particles, such as hydrophobic silica, for example, or wax particles to the defoamer liquid it is possible to increase the defoamer action further.

Wetting agents and dispersing assistants are used in order to obtain optimum distribution of pulverulent pigments and fillers in the aqueous formulation compositions that are obtainable in accordance with the invention. In such compositions the wetting agents and dispersing assistants assist the dispersing operation by facilitating the wetting of the pulverulent pigments and fillers in the aqueous dispersion medium (wetting agent effect), by breaking up powder agglomerates (disruption effect), and by providing steric or electrostatic stabilization of the primary pigment and filler particles that are formed in the course of the shearing operation (dispersant effect). Wetting agents and dispersing assistants used in particular are the polyphosphates and salts of polycarboxylic acids that are familiar to the skilled worker, particularly sodium salts of polyacrylic acids and/or acrylic acid copolymers.

If necessary it is possible to use the acids or bases familiar as neutralizing agents to the skilled worker to adjust the pH of the aqueous formulation compositions that are obtainable in accordance with the invention.

In order to avoid infestation of the aqueous formulation compositions that are obtainable in accordance with invention, during preparation, handling, storage, and application, by microorganisms, such as bacteria, fungi (including molds) or yeasts, for example, it is common to use biocides or preservatives which are familiar to the skilled worker. In this context use is made in particular of active-substance combinations of methyl- and chloroisothiazolinones, benzisothiazolinones, form and/or formaldehyde donors.

Besides aforementioned auxiliaries it is also possible to add further auxiliaries, familiar to the skilled worker, to the aqueous formulation compositions that are obtainable in accordance with the invention, during preparation, handling, storage, and application, examples of such auxiliaries including dulling agents, waxes or leveling assistants, etc.

It is also noted that the aqueous composite-particle dispersions obtainable in accordance with the invention can be dried in a way which is easy and is known to the skilled worker to form redispersible composite-particle powders (e.g., by freeze drying or spray drying). This is particularly the case when the glass transition temperature of the polymer matrix of the composite particles obtainable in accordance with the invention is $\geq 50°$ C., preferably $\geq 60°$ C., more preferably $\geq 70°$ C., very preferably $\geq 80°$ C., and with particular preference $\geq 90°$ C. The composite-particle powders obtainable in accordance with the invention are suitable, among other things, as additives for plastics, as components for toner formulations or as additives in electrophotographic applications, and also as components in cement formulations and mortar formulations.

The invention is illustrated in more detail with reference to the following, nonlimiting example.

EXAMPLES

1. Preparation of an Aqueous Composite-Particle Dispersion D1

A 2 l four-necked flask equipped with a reflux condenser, a thermometer, a mechanical stirring and a metering device was charged under nitrogen atmosphere at from 20 to 25° C. (room temperature) and 1 bar (absolute) and with stirring (200 revolutions per minute) with 416.6 g of Nyacol® 2040 and then with a mixture of 2.5 g of methacrylic acid and 12 g of a 10% strength by weight aqueous solution of sodium hydroxide, added over the course of 5 minutes. Thereafter, a mixture of 10.4 g of a 20% strength by weight aqueous solution of the nonionic surfactant Lutensol® AT 18 (brand name of BASF AG, $C_{16}C_{18}$ fatty alcohol ethoxylate having 18 ethylene oxide units) and 108.5 g of deionized water was added over the course of 15 minutes to the stirred reaction mixture. Thereafter, 0.83 g of N-cetyl-N,N,N-trimethylammonium bromide (CTAB) in solution in 200 g of deionized water was metered into the reaction mixture over 60 minutes. The reaction mixture was then heated to a reaction temperature of 80° C.

Prepared in parallel were feed stream 1, a monomer mixture consisting of 115 g of methyl methacrylate (MMA), 127.5 g of n-butyl ac late (n-BA), 5 g of glycidyl methacrylate (GMA) and 0.5 g of methacryloyloxypropyltrimethoxysilane (MEMO), and feed stream 2, an initiator solution consisting of 2.5 g of sodium peroxodisulfate, 7 g of a 10% strength by weight aqueous solution of sodium hydroxide, and 200 g of deionized water.

Subsequently, 21.1 g of feed stream 1 and 57.1 g of feed stream 2 were added to the reaction mixture, stirred at reaction temperature, via two separate feed lines over 5 minutes. The reaction mixture was then stirred at reaction temperature for one hour. Thereafter, 0.92 g of a 45% strength by weight aqueous solution of Dowfax® 2A1 was added to the reaction mixture. The remainders of feed streams 1 and 2 were then metered continuously into the reaction mixture over the course of 2 hours, beginning simultaneously. Thereafter the reaction mixture was stirred at reaction temperature for one hour more and then cooled to room temperature.

The aqueous composite-particle dispersion thus obtained had a solids content of 35.1% by weight, based on the total weight of the aqueous composite-particle dispersion.

The solids content was determined by drying about 1 g of the aqueous composite-particle dispersion to constant weight in an open aluminum crucible having an internal diameter of approximately 3 cm in a dying oven at 150° C. To determine the solids content, two separate measurements were conducted in each case and the corresponding average was formed.

The amount of inorganic solid in the composite particles is calculated at 40° by weight, based on the total solids content of the aqueous composite-particle dispersion/on the total composite-particle weight.

The addition polymer of the composite particles obtained had a glass transition temperature of <5° C. (DIN 53 765).

The average particle diameter ($d_{50}$) of the composite particles obtained, as determined by the means of the analytical ultracentrifugation method, was 70 nm.

2. Preparation of an Aqueous Comparative Composite-Particle Dispersion C1

The comparative composite-particle dispersion C1 was prepared in the same way as for D1, with the exception that feed stream 1 used was a monomer consisting of 117.5 g of MMA, 130 g of n-BA and 0.5 g MEMO.

The aqueous comparative dispersion thus obtained had a solids content of 35.1% by weight, based on the total weight of the aqueous composite-particle dispersion. The average particle diameter ($d_{50}$) of the composite particles was 65 nm. The addition polymer of the comparative composite particles had a glass transition temperature of <5° C.

The amount of inorganic solid in the comparative composite particles is likewise calculated at 40% by weight, based on the total solids content of the aqueous composite-particle dispersion.

3. Performance Investigations

The aqueous dispersions D1 and C1 were dried in silicone rubber molds at 23° C. and 50% relative humidity for 7 days to give composite films approximately 0.4 to 0.7 mm in thickness. The breaking-tension measurements carried out on the films were conducted using a 4464 tensile testing machine from Instron in accordance with DIN 53455/rod 3 (take-off speed 100 mm/min).

In all, 2 series of measurements, each comprising 6 individual measurements, were carried out. The first series of measurements was carried out on the composite films dried at 23° C. and 50% relative humidity (breaking tension 1). The second series of measurements was carried out on dried composite films which following their seven-day drying at 23° C. and 50% relative humidity were stored for a further 60 hours at 23° C. and 100% relative humidity (breaking tension 2). The results obtained for the breaking-tension measurements are indicated in the table below. The breaking tensions 1 and 2 indicated in the table represent the mean values of the 6 independent measurements in each case.

| Composite film obtained from | Breaking tension 1 [in MPa] | Breaking tension 2 [in MPa] |
|---|---|---|
| D1 | 12.1 +/− 0.9 | 5.0 +/− 0.5 |
| C1 | 9.9 +/− 0.4 | 3.4 +/− 0.2 |

From the aforementioned results it is clearly apparent that the breaking tensions of the composite film obtainable from the aqueous composite-particle dispersion D1 of the invention (comprising a monomer containing epoxide groups, in copolymerized form) are well above the breaking tensions of the composite film obtainable from the comparative dispersion C1 (comprising no monomer containing epoxide groups in copolymerized form).

The invention claimed is:

1. A process for preparing an aqueous dispersion of composite particles comprising an addition polymer and finely divided inorganic solid, said process comprising free-radical aqueous emulsion polymerization of a monomer mixture of ethylenically unsaturated monomers dispersely distributed in aqueous medium in the presence of at least one free-radical polymerization initiator and in the presence of at least one dispersely distributed, finely divided inorganic solid and at least one dispersant, wherein the monomer mixture comprises at least one ethylenically unsaturated monomer A and >0 and ≦10% by weight of at least one ethylenically unsaturated epoxide monomer B comprising an epoxide group, wherein monomer A is selected from the group consisting of ethylene, vinylaromatic monomers, esters of vinyl alcohol and $C_1$-$C_{18}$ monocarboxylic acids, esters of $C_3$-$C_6$ α,β-monoethylenically unsaturated mono- and dicarboxylic acids with $C_1$-$C_{12}$ alkanols, nitriles of α,β-monoethylenically unsaturated carboxylic acids, and $C_{4-8}$ conjugated dienes, and which monomer A optionally additionally comprises an ethylenically unsaturated monomer which comprises a siloxane group.

2. The process according to claim 1, wherein said at least one dispersant used is an anionic and/or nonionic dispersant.

3. The process according to claim 1, wherein said at least one dispersant used is an anionic, cationic, and nonionic dispersant.

4. The process according to claim 3, wherein
 a) a stable aqueous dispersion of said at least one inorganic solid is used, said dispersion having the characteristic features that at an initial solids concentration of ≧1% by weight, based on the aqueous dispersion of said at least one inorganic solid, it still comprises in dispersed form one hour after its preparation more than 90% by weight of the originally dispersed solid and its dispersed solid particles have a diameter ≦100 nm,
 b) the dispersed particles of said at least one inorganic solid exhibit a nonzero electrophoretic mobility in an aqueous standard potassium chloride solution at a pH which corresponds to the pH of the aqueous reaction medium before the beginning of the dispersant addition, c) at least one anionic, cationic and nonionic dispersant is added to the aqueous solid-particle dispersion before the beginning of the addition of the monomer mixture, d) then from 0.01 to 30% by weight of the total amount of the monomer mixture is added to the aqueous solid-particle dispersion and polymerized to a conversion of at least 90%, and e) thereafter the remainder of the monomer mixture is added continuously under polymerization conditions at the rate at which it is consumed.

5. The process according to claim 4, wherein from 1 to 1000 parts by weight of said at least one finely divided inorganic solid are used per 100 parts by weight of monomer mixture and wherein a) when the dispersed solid particles have an electrophoretic mobility having a negative sign, from 0.01 to 10 parts by weight of at least one cationic dispersant, from 0.01 to 100 parts by weight of at least one nonionic dispersant, and at least one anionic dispersant are used, the amount thereof being such that the equivalent ratio of anionic to cationic dispersant is more than 1, or b) when the dispersed solid particles have an electrophoretic mobility having a positive sign, from 0.01 to 10 parts by weight of at least one anionic dispersant, from 0.01 to 100 parts by weight of at least one nonionic dispersant, and at least one cationic dispersant are used, the amount thereof being such that the equivalent ratio of cationic to anionic dispersant is more than 1.

6. The process according to claim 5, wherein a) in the presence of dispersed solid particles having an electrophoretic mobility having a negative sign, some or all of said at least one anionic dispersant is replaced by the equivalent amount of at least one monomer E comprising at least one acid group and/or its corresponding anion, and b) in the presence of dispersed solid particles having an electrophoretic mobility having a positive sign, some or all of said at least one cationic dispersant is replaced by the equivalent amount of at least one monomer F comprising at least one amino, amido, ureido or N-heterocyclic group and/or the N-protonated or N-alkylated ammonium derivatives thereof.

7. The process according to claim 3, wherein said at least one nonionic dispersant is added before said at least one cationic and anionic dispersant.

8. The process according to claim 1, wherein said at least one inorganic solid is selected from the group consisting of silicon dioxide, aluminum oxide, hydroxyaluminum oxide, calcium carbonate, magnesium carbonate, calcium orthophosphate, magnesium orthophosphate, iron(II) oxide, iron (III) oxide, iron(II/III) oxide, tin(IV) oxide, cerium(IV) oxide, yttrium(III) oxide, titanium dioxide, hydroxylapatite, zinc oxide and zinc sulfide.

9. The process according to claim 1, wherein said at least one inorganic solid is a pyrogenic and/or colloidal silica, a silicon dioxide sol and/or a phyllosilicate.

10. The process according to claim 1, wherein glycidyl acrylate and/or glycidyl methacrylate is used as said at least one epoxide monomer.

11. The process according to claim 1, wherein the monomer mixture comprises from 0.01 to 5% by weight, based on the total amount of the monomers A, of ethylenically unsaturated monomers which contain a siloxane group.

12. The process according to claim 1, wherein the total amount of said at least one epoxide monomer in the monomer mixture is from 0.1 to 5% by weight.

13. The process according to claim 1, wherein the composition of the monomers A is chosen such that polymerization of them alone would result in an addition polymer having a glass transition temperature $\leq 60°$ C.

14. An aqueous dispersion of composite particles obtained by a process according to claim 1.

15. A composite-particle powder obtainable by drying an aqueous dispersion of composite particles according to claim 14.

16. The process according to claim 1, wherein the total amount of said at least one epoxide monomer in the monomer mixture is from 0.5 to 3% by weight.

17. The process according to claim 1, wherein the addition polymer has a glass transition temperature of $\leq 100°$ C. and $\geq -5°$ C.

18. The process according to claim 1, wherein monomer A comprises methyl methacrylate, n-butyl acrylate and 3-methacryloyloxypropyltrimethoxysilane.

* * * * *